(12) United States Patent
Toto

(10) Patent No.: US 7,383,661 B2
(45) Date of Patent: Jun. 10, 2008

(54) OZONE TREATMENT OF MUSHROOM HOUSE

(76) Inventor: Remo Toto, 687 Oxford Rd., Lincoln University, PA (US) 19352

(*) Notice: Subject to any disclaimer, the term of this patent is extended or adjusted under 35 U.S.C. 154(b) by 173 days.

(21) Appl. No.: 11/320,279

(22) Filed: Dec. 28, 2005

(65) Prior Publication Data
US 2007/0144064 A1 Jun. 28, 2007

(51) Int. Cl.
*A01G 1/04* (2006.01)
(52) U.S. Cl. .................................................. 47/1.1
(58) Field of Classification Search ............ 47/1.1, 47/17
See application file for complete search history.

(56) References Cited

U.S. PATENT DOCUMENTS

| 5,503,647 A | 4/1996 | Dahlberg |
| 5,935,431 A | 8/1999 | Korin |
| 6,018,906 A | 2/2000 | Pia |
| 6,073,388 A | 6/2000 | Kananen |
| 6,426,053 B1 | 7/2002 | Barnes |
| 6,951,633 B1 | 10/2005 | Barnes |
| 2004/0082479 A1 | 4/2004 | Mirelman |
| 2005/0066537 A1 | 3/2005 | Kahner |

FOREIGN PATENT DOCUMENTS

| JP | 402084113 A | * | 3/1990 |
| JP | 408047335 A | * | 2/1996 |
| KR | 2005114763 A | * | 12/2005 |

* cited by examiner

*Primary Examiner*—Trinh Nguyen
(74) *Attorney, Agent, or Firm*—Connolly Bove Lodge & Hutz

(57) ABSTRACT

The interior of a mushroom house is sterilized by applying ozone into the interior of the mushroom house around compost in receptacles in the mushroom house. The ozone is applied prior to the spawning step in the growing of the mushrooms.

14 Claims, 3 Drawing Sheets

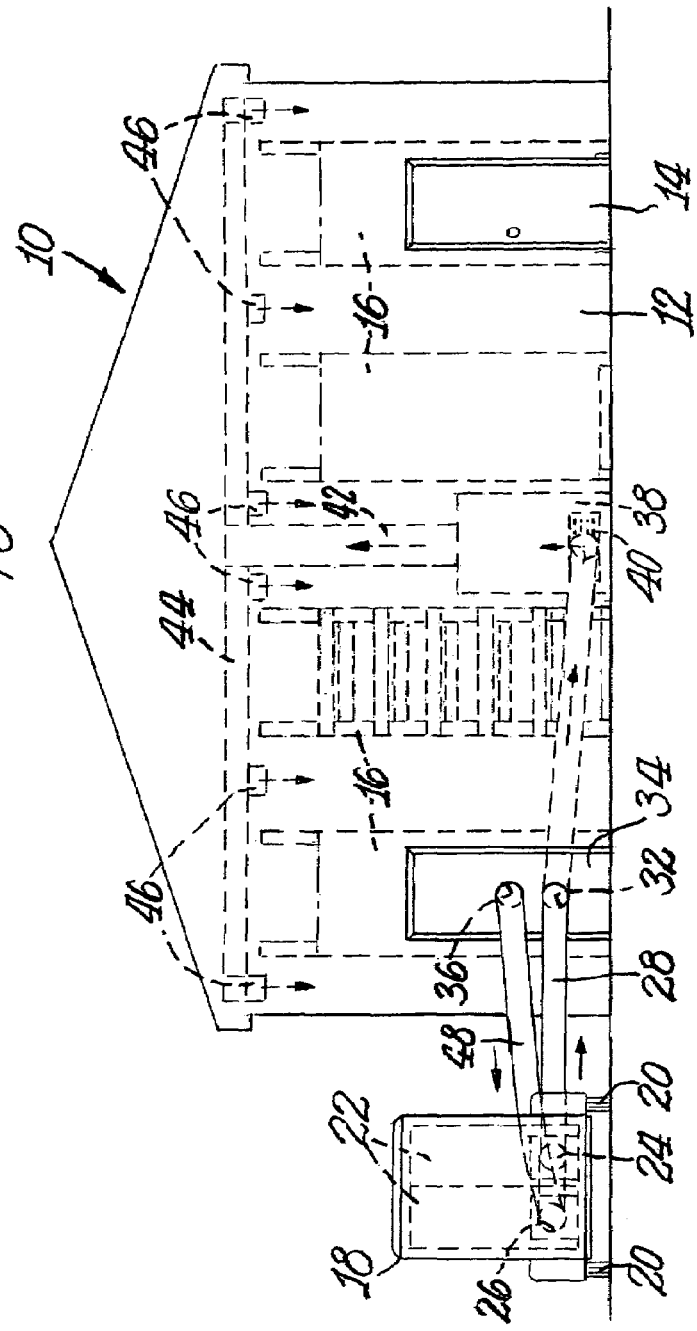

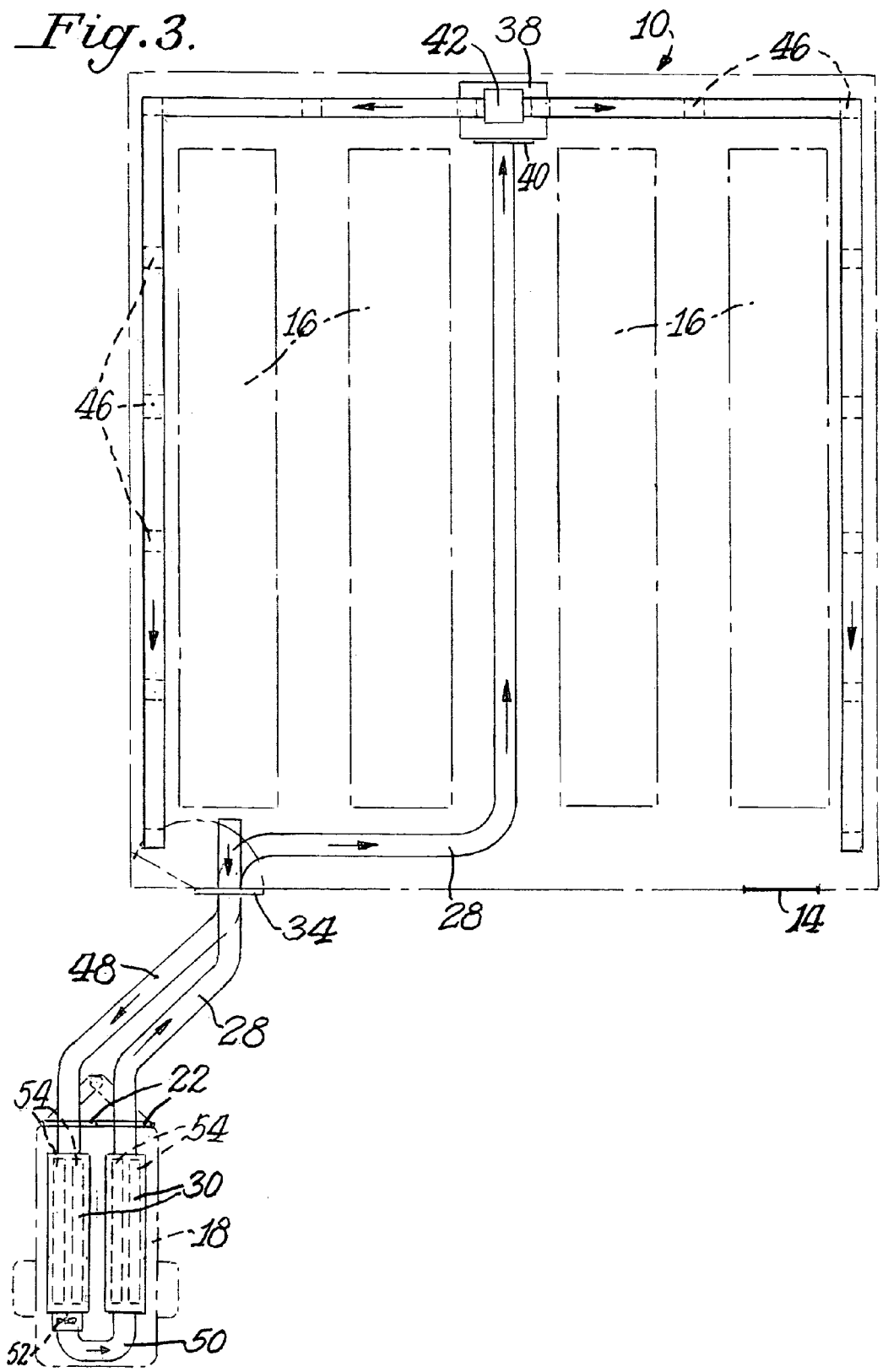

OZONE TREATMENT OF MUSHROOM HOUSE

BACKGROUND OF THE INVENTION

The growing of mushrooms is done under controlled conditions for a lengthy period of time. Various standard techniques are known. Some of these techniques are described in U.S. Pat. No. 6,018,906, all of the details of which are incorporated herein by reference thereto. As pointed out, two common techniques for mushroom cultivation are in the use of mushroom beds or shelves and in a tray system. Other methods of growing mushrooms have been the bag system, the ridge bed system and deep trough system. These systems, particularly the bed and the tray systems include two distinct phases. Phase I is generally done outdoors and involves composting the material to be used for cultivating the mushrooms. The compost is then conveyed into a mushroom house and fills the receptacles, such as beds or trays. In general, the compost is then heated to pasteurize the compost and ensure that the compost is free from most mushroom pests and diseases. The pasteurized compost then undergoes a cool down procedure. The pasteurizing step could take up to 14 days and the cool down procedure could take about 3 days. The next operation is the spawning where the compost is inoculated with mushroom mycelia by distributing particulate material colonized with mushroom mycelia (spawn) through the compost. The spawning run might take about 14 to 16 days. Next the colonized compost is covered by a layer of nutrient poor material or casing. The casing layer holds the moisture so that the mycelium must grow through the casing layer. The next step might be considered a flash step which occurs about twenty days after the mycelium breaks through the casing layer. The flash step is the first picking of cultivated mushrooms. Finally, after the mushroom heads break through the casing layer there is a final harvesting of the mushrooms. Reference is also had to U.S. Pat. Nos. 6,073,388 and 5,503,647, all of the details of which are incorporated herein with regard to mushroom growing techniques.

In order to provide the best form of cultivated mushrooms under these controlled conditions it would be desirable if there were some assurance of having the mushroom house in a sterilized condition to prevent outside contamination interfering with the mushroom growth. It has been known in other fields to use ozone as a means of sterilization. The use of ozone in connection with the growing of mushrooms, however, has not heretofore been contemplated. One reason, perhaps is that ozone might be considered to create detrimental aesthetic and health affects if the ozone contacts the mushrooms.

SUMMARY OF THE INVENTION

An object of this invention is to provide improvements in the sterilization of a mushroom house.

A further object of this invention is to provide such sterilization through the use of the application of ozone.

In accordance with this invention ozone is applied throughout the interior of the mushroom house before the spawning step so that there is no danger of the ozone contacting the spawn or mushrooms. Optionally, additional ozone applications may be made after the spawning step and before the casing step and even immediately after the casing step. A final ozone application could be made after the mushrooms have been harvested and are no longer in the house.

A BRIEF DESCRIPTION OF THE DRAWINGS

FIG. 1 is a schematic front elevational view showing a mushroom house being treated by the application of ozone in accordance with this invention;

FIG. 2 is a front elevational view of a trailer used for generating ozone;

FIG. 3 is a schematic top plan view of the mushroom house shown in FIG. 1 and indicating the path taken by the ozone.

DETAILED DESCRIPTION

Figure 4:
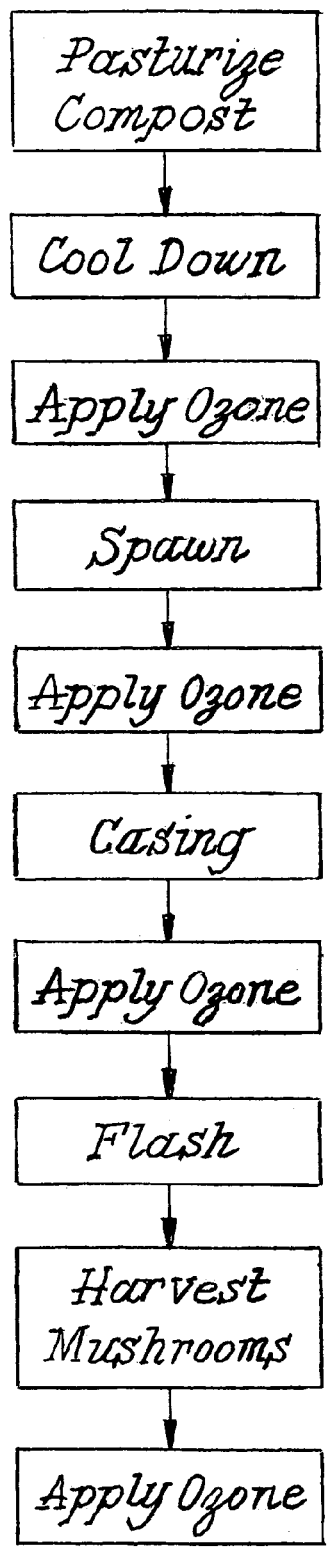
FIG. 4 is a flow diagram of the steps used in the growing of mushrooms in accordance with this invention.

The present invention is based upon the recognition that ozone could be used to effectively sterilize a mushroom house if care is taken in selecting the specific times that the ozone is applied so as to minimize the possibility of the ozone coming into direct contact with the mushrooms. The present invention may be used with various techniques known for growing mushrooms, such as described in U.S. Pat. Nos. 6,018,906, 6,073,388 and 5,503,647, all of the details of which are incorporated herein by reference thereto. In general, the present invention involves applying the ozone to the interior of a mushroom house or enclosure wherein a plurality of receptacles are located for use in growing the mushrooms. The receptacles could be in the form of beds or trays, although the invention is not limited to those mushroom growing methods. In such a practice of the invention, each receptacle would be filled with compost and the compost would undergo the conventional known steps which would result in the cultivation and harvesting of the mushrooms. In accordance with the invention ozone is applied at least once during the general mushroom growing steps.

FIG. 1 schematically illustrates a mushroom house 10 in the form of an enclosure having a plurality of walls 12 and at least one door 14 to permit workers or others to enter the interior of the mushroom house 10.

In the embodiment of the mushroom house shown in FIG. 1 there are a plurality of multi-tiered beds 16. For example, there may be four tiers or stacks of beds 16, each of which has six receptacles vertically stacked, thereby resulting in 24 receptacles. Where the invention is practiced in the tray system there might be sets of trays stacked four to five trays high and arranged in 11 rows.

As shown in FIGS. 1 and 3 an ozone generator assembly 18 is provided. Assembly 18 is readily transportable such as by being incorporated in a trailer mounted on wheels 20. [Although not as preferred, the assembly 18 could be permanently or movably mounted within the mushroom house.] The trailer has a plurality of walls. One of the walls 22 which may be a door has a pair of openings 24,26. See, also FIG. 2. One of these openings, such as opening 24, has a preferably flexible tube or hose 28 mounted through the opening in communication with an ozone generator 30 within the trailer. See FIG. 3. The flexible hose 28 extends through an inlet 32 in a panel 34 formed in one of the walls 12 of the mushroom house 10. Panel 32 could be a customized door which would be similar to conventional door 14 except that it includes the inlet opening 32 and an outlet opening 36. Although not as preferred, openings 32 and/or 36 could be directly in the wall 12.

As shown in FIG. 3 ozone distributing structure including a hose 28 is used for conveying ozone from the ozone generator 30 into the interior of the house 10. Hose 28 leads to and communicates with a plenum 38. Although a single hose 28 is shown as extending from generator 30 to plenum 38 the hose 28 may be made of a plurality of hose segments. For example, one hose segment might extend from generator 30 and be mounted to panel 34 at inlet 32 externally of wall 12. A second hose segment would be located within house 10 and mounted at inlet 32 for communication with the external hose. The interior hose segment could then lead to the plenum 38.

A blower 40 is provided at plenum 38 to assist in directing the ozone from the plenum upwardly through chamber 42 as shown in FIGS. 1 and 3. Chamber 42 communicates with a manifold 44 located at the top of mushroom house 10. Manifold 44 is formed by suitable duct work to distribute the ozone and permit the ozone to be discharged at spaced locations through the plurality of vents or discharge openings or outlet tubes 46.

Plenum 38 contains a heat pump which in conjunction with blower 40 feeds the ozone through the chamber 42 and into the manifold 44 and finally through outlets 46.

The ozone entering the interior of mushroom house 10 causes the oxygen containing air to be displaced and discharged into the outlet hose 48. This is facilitated by suction means in assembly 18 applying suction to hose 48. As best shown in FIG. 3 one end of hose 48 extends into the interior of mushroom house 10 and is open and exposed for receiving the oxygen containing air. The open end of hose 48 is preferably substantially below outlets 46. The oxygen containing air then returns to the ozone generator assembly 18 and the oxygen is used as a source for the ozone. Air outlet 36 and hose 48 are part of air conveyor structure.

In a preferred practice of this invention the inlet opening 32 is located directly below and in line with the outlet opening 36 in panel 34. FIG. 3 illustrates panel 34 as being in the form of a door which can be swung to the open position shown in phantom. This provides further access to the interior of the mushroom house 10, particularly when the flexible hoses 28,48 are not connected to the panel 34. Where panel 34 is of the size of a conventional door, such as being from six to eight feet high, the upper outlet opening 36 would be located about midway up the door or panel 34 and the lower inlet or intake opening 32 would be about halfway between the upper or exhaust opening 36 and the bottom of the door. The invention may be practiced where openings 32,36 are at different locations including being remote from each other. Preferably the openings are near each other so that both openings are near assembly 18.

The ozone generator assembly 18 may take any suitable form. For example, U.S. Pat. Nos. 5,935,431, 6,426,053 and 6,951,633, all of the details of which are incorporated herein by reference thereto, describe various ozone generators. As illustrated in FIG. 3 a preferred ozone generator assembly includes a plurality of individual generators 30,30, two of which are shown with adjacent pairs of ozone generators interconnected by connector line 50. The set of generators might thus be considered as forming a string or chain of interconnected generators wherein the upstream most generator receives the oxygen containing air from hose 48 and the downstream most generator discharges the converted ozone into hose 28.

As illustrated in FIG. 3 the ozone generator assembly 18 also includes a fan 52 and ultraviolet lamps 54 in a known manner.

Any suitable dimensions and materials may be used for the various components in the practice of this invention. For example, each of the openings 24, 26, 32 and 36 may be 12 inches in diameter. The ozone generator assembly 18 could operate to pull air from the mushroom house at a rate, for example, of 1200 cfm. The various hoses would have a diameter comparable to their particular openings. The panel or door 34 could be made of any suitable material, such as plywood. Other parts of mushroom house 10 would preferably be made in a conventional manner using conventional materials and conventional dimensions.

A further advantage of the present invention is that the ozone is used in a work environment which would not be affected by thunderstorms or other acts of nature.

FIG. 4 schematically illustrates the practice of this invention as used in steps during mushroom cultivation or growing as indicated in flow diagram form.

In general, the cultivation of mushrooms involves composting the material which is to be used for growing the mushrooms. This composting stage could be done outdoors or in some location apart from the mushroom house 10. The compost is then brought into the growing room and filled in the receptacles in the mushroom house 10 such as being filled in beds 16 or in trays. The compost would then undergo a pasteurizing step shown in FIG. 4 which reaches a peak heat in about 3-4 days. The pasteurizing step kills flies and diseases to ensure that the mushroom will be free of pests and disease.

Next the compost undergoes a cool down stage which could take approximately two weeks. In the cool down stage the temperature of the compost in the bed is lowered to about 75° F. and the surrounding air is about 68° F.

In conventional mushroom cultivation the next operation would be spawning which is similar to the planting of seed in conventional farming. In spawning the compost is inoculated with mushroom mycelia by distributing particulate material colonized with the mushroom mycelia so that the compost becomes colonized.

In accordance with this invention before the spawning stage takes place, ozone is applied to the mushroom house to kill any organic material that might otherwise damage the compost. Such materials include, for example, bacteria, mold, spores, virus and flies. The ozone is pumped into the mushroom house 10 through the duct work and discharged into the interior of the mushroom house enclosure as previously described. This step is preferably done one to two days before the spawning step. The ozone is permitted to work its way through the duct work for about four hours to about twenty-four hours in order to assure proper sterilization.

Depending upon how much sterilization is needed with regard to how dirty the mushroom house is, a second ozone applicating step might also be made after the spawning step. Again, at least 4-24 hours would be permitted for the ozone to pass through the duct work and enter the interior of mushroom house 10 around the receptacles which could be the mushroom beds 16 or trays during the spawning stage.

The invention takes into account the recognition that periodically someone, such as a worker, may enter the mushroom house for various reasons such as to check if there is mycelia growth through the surface of the compost. When someone thereby enters the mushroom house it is possible that conditions may be created which would make an additional ozone application step desirable.

Generally, the spawning run or stage takes about 14 days during which the compost turns white from the intense growth of the spawn.

The next stage would be the casing stage where a layer of casing material, such as peat moss which could be, for example, 1 ¾ inch thick is applied to the top of the compost to hold the moisture and assure that the mycelia must grow through the casing layer.

As illustrated in FIG. 4 after the casing stage an optional application of ozone may be done to further assure sterile conditions.

The next stage, as illustrated in FIG. 4, could be considered the flash stage where there is the first pick of mushrooms. This could take place about 20 days after the mycelia breaks through the casing layer. Finally, the mushroom heads break through the casing layer and are visible which then leads to the harvesting of the cultivated mushrooms.

After the mushrooms have been harvested and removed from the mushroom house the mushroom house may undergo a further ozone treatment.

As is apparent the invention could be practiced with from one to a plurality of ozone applications depending upon how dirty the mushroom house is. In the preferred practice of the invention an ozone application takes place after pasteurization of the compost and before the spawning stage. This is a safe period of time because the mushroom mycelia has not yet been inoculated into the compost and there is thus assurance that the ozone would have no adverse affect on the mushrooms. Similarly, the last ozone application step after the mushrooms have been harvested and removed from the mushroom house is a further safe time for ozone application. The optional intermediate steps are not as desirable to the extent any of the steps is performed closer to the actual growth of the mushrooms. These optional steps would be done as needed in accordance with the condition of the mushroom house. In general, the invention could be practiced with from one to five applications of ozone. FIG. 4 illustrates four applications. One or more further more applications could be done as stages of one of the indicated applications. For example, if prior to spawning it is determined that the ozone application did not sufficiently sterilize the house a second ozone application could be done which might be considered as a second stage of the first application. The invention, however, could be practiced where separate distinctly different ozone applications are performed at various stages of the process.

What is claimed is:

1. A mushroom house comprising an enclosure, at least one mushroom growing receptacle in said enclosure, an ozone generator assembly, ozone distributing structure communicating with said ozone generator assembly, and said ozone distributing structure being located in said enclosure and having at least one discharge outlet exposed to an open portion of the interior of said enclosure externally of and spaced from said at least one receptacle to feed ozone into and throughout said interior of said enclosure and to thereby sterilize said interior of said enclosure with the ozone flowing freely throughout said interior of said enclosure and the flow of ozone being around said at least one receptacle wherein said ozone generator assembly is located externally of said enclosure, an inlet in a wall of said enclosure, said ozone distributing structure including a hose between said ozone generator assembly and said inlet, and an air outlet in said enclosure for discharging air from said enclosure which had been displaced by ozone entering said enclosure, wherein said ozone distributing structure within said enclosure communicates with said inlet and has multiple spaced discharge outlets for discharging ozone at multiple locations within said enclosure including at the top of said enclosure, and wherein said ozone distributing structure includes a hose within said enclosure mounted at said inlet and communicating with a plenum in said enclosure, said plenum having a heat pump and a blower to facilitate the feeding of the ozone into a manifold having said spaced discharge outlets at spaced locations within said enclosure.

2. The mushroom house of claim 1 wherein said air outlet has conveyor structure for directing the air from said enclosure to said ozone generator assembly.

3. The mushroom house of claim 1 wherein said inlet is mounted below said air outlet.

4. The mushroom house of claim 3 wherein said discharge outlets of said manifold are located in a top portion of said mushroom house at a location vertically above said air outlet.

5. The mushroom house of claim 4 wherein said air conveyor structure includes an air hose mounted at said air outlet and communicating with said ozone generator assembly to feed the air to said assembly.

6. The mushroom house of claim 1 wherein said hose is an air hose which has an open end extending into and exposed in the interior of said enclosure to permit air to enter said air hose.

7. The mushroom house of claim 6 wherein said inlet and said air outlet are located in a panel mounted to said wall of said enclosure.

8. The mushroom house of claim 7 wherein said ozone and air hoses are flexible and extend respectively through said inlet and said air outlet at said panel.

9. The mushroom house of claim 8 wherein said panel is an openable/closeable door, and said wall having a further door to permit workers to enter said enclosure.

10. The mushroom house of claim 6 wherein said plenum is mounted generally at the floor of said enclosure.

11. The mushroom house of claim 6 wherein said at least one receptacle comprises a plurality of receptacles mounted in sets of multi-tiered vertical beds.

12. The mushroom house of claim 1 including mushroom compost in said at least one receptacle.

13. A mushroom house comprising an enclosure, at least one mushroom growing receptacle in said enclosure, an ozone generator assembly, ozone distributing structure communicating with said ozone generator assembly, and said ozone distributing structure being located within said enclosure to feed ozone into said enclosure around said at least one receptacle, said ozone generator assembly being located externally of said enclosure, an inlet in a wall of said enclosure, said ozone distributing structure including a hose between said ozone generator assembly and said inlet, an air outlet in said enclosure for discharging air from said enclosure, said ozone distributing structure within said enclosure communicating with said inlet and having multiple spaced discharge outlets for discharging ozone at multiple locations within said enclosure, said ozone distributing structure including a hose within said enclosure mounted at said inlet and communicating with a plenum in said enclosure, said plenum having a heat pump and a blower to facilitate the feeding of the ozone into a manifold having said spaced discharge outlets at spaced locations within said enclosure, said inlet being mounted below said air outlet, said discharge outlets of said manifold being located in a top portion of said mushroom house at a location vertically above said air outlet, said air conveyor structure including an air hose mounted at said air outlet and communicating with said ozone generator assembly to feed the air to said assembly, said ozone generator assembly including a transportable trailer having an interior and at least one wall, at least one ozone generator in said interior, said air hose being connected to an upstream portion of said at least one ozone generator, said ozone hose being connected to the downstream end of said at least one ozone generator, and said ozone generator assembly further including structure for drawing air from the interior of said enclosure and into said air hose.

14. The mushroom house of claim 13 wherein there are at least two of said ozone generators with adjacent pairs of said ozone generators being interconnected by a connector line to create a chain of said ozone generators including an upstream most generator and a downstream most generator, said air hose being connected to said upstream most generator, said ozone hose being connected to said downstream most generator, said air hose and said ozone hose passing through said wall of said trailer, and said trailer having wheels to facilitate the transportability of said trailer.

* * * * *